United States Patent [19]
Schneider

[11] 3,979,809
[45] Sept. 14, 1976

[54] PIPE ELBOW AND METHOD OF MAKING SAME

[76] Inventor: Johann Friedrich Schneider, Roemerstrasse 33, Bad Homburg, Germany, D-638

[22] Filed: Oct. 6, 1975

[21] Appl. No.: 620,158

Related U.S. Application Data

[63] Continuation-in-part of Ser. No. 530,365, Dec. 6, 1974, abandoned.

[30] Foreign Application Priority Data

Dec. 24, 1973 Germany............................ 2364552

[52] U.S. Cl.................................. 29/157 A; 29/416; 113/116 UT; 228/170; 285/157; 285/179
[51] Int. Cl.².................... B21D 53/00; B23P 15/26
[58] Field of Search................. 113/116 UT, 116 W; 29/416, 157 R, 157 A, 157 T; 228/170, 171; 285/157, 179, 286

[56] References Cited
UNITED STATES PATENTS
2,147,431    2/1939    Ewing .......................... 29/157 R X

OTHER PUBLICATIONS
Fabrication of Oxy–Acetylene Welded Steel & Wrought Iron Piping–The Linde Air Products Co— Copyright 1940–pp. 27,28,29 and 40.

*Primary Examiner*—Victor A. DiPalma
*Attorney, Agent, or Firm*—W. G. Fasse; W. W. Roberts

[57] ABSTRACT

The present pipe elbow includes at least two straight pipe sections joined together along a Y-seam, for example by welding. The Y-configuration of the seam is such, that the three limbs thereof all have the same length, whereby these limbs meet at a point off center relative to the central axis of the pipe. The elbow is formed by making a straight cut at right angles toward the longitudinal axis of the pipe and slightly through said longitudinal axis and by further cutting the straight pipe at acute angles so that second and third cuts meet the first cut at said off center point. These cuts result in wedge segments which fit exactly into the space between the arms of the Y-configuration when the pipe edges are joined along the leg of the Y-configuration. Thus, the present process does not produce any waste whatsoever.

3 Claims, 5 Drawing Figures

PIPE ELBOW AND METHOD OF MAKING SAME

This application is a continuation-in-part of copending application Ser. No. 530,365 filed Dec. 6, 1974, now abandoned.

BACKGROUND OF THE INVENTION

This invention relates to pipe elbows or bends, and a method for making the same, and is particularly directed to a more economically produced pipe elbow or bend, as compared with known elbows or bends. While the invention is of especial importance with respect to pipe elbows of large diameter, it will be apparent that the invention is also useful with respect to pipe elbows or bends of smaller diameter.

In the past, it has been conventional to produce pipe elbows or bends, wherein each of the pipe sections, when viewed from the side, have a trapezoidal shape, the pipe sections being joined together so that the shorter sides of the trapezoids are on the side of the pipe elbow toward the center of curvature of the elbow.

In the formation of such pipe elbows, the trapezoidal sections were cut in a suitable manner from a straight pipe. The cutting resulted in the formation of waste portions between the adjacent sections of the pipe elbow, and such waste portions had only scrap value.

OBJECTS OF THE INVENTION

In view of the above, it is the object of the invention to provide a method for producing a pipe elbow or bend, wherein the pipe elbow or bend is formed from a straight pipe, and wherein the material of the pipe is completely employed, i.e., without waste, and wherein the pipe elbow or bend may be formed from pipe of any suitable pipe diameters using the corresponding standard pipe stock.

A further object of the invention is to provide a pipe elbow or bend, wherein the sections of the elbow and the inserts therebetween are formed of straight pipe, and wherein the pipe may be formed in an economical manner without waste.

SUMMARY OF THE INVENTION

Briefly stated, in accordance with the method of the present invention, the above objects are achieved by making, at intervals, three cuts in a straight pipe, so that one of the cuts at each interval extends normal to the axis of the pipe from one side of the pipe and the other two cuts extend in planes at acute angles to the axis of the pipe from the opposite side thereof, whereby the three cuts at each interval intersect to form a pair of pipe sections and a wedge shaped element or gusset. The legs of the three cuts form a Y-shape. The edges of the pipe sections from which the wedge shaped gusset is removed are joined together, as by welding, and the wedge shaped section is then employed as an insert between the now spaced apart cuts extending normal to the axes of the respective pipe sections. In this manner a Y-shaped joint is provided to form the pipe elbow or bend, as viewed from the sides of the elbow. The cuts in the pipe are made in such a manner that the lengths of the Y-shaped legs of each joint, as viewed from the side of the elbow, are equal to each other whereby it is assured that the straight pipe section from which the elbow is formed is completely utilized, without any waste, because the gussets resulting from the cutting of the straight pipe as taught by the invention fit perfectly into the openings resulting from assemblying the cut pipe sections into an elbow.

The pipe elbow in accordance with the invention, as produced by the above process, comprises at least two straight pipe sections, each section having at an end thereof a first cut extending normal to the central axis from one side of the respective section and a second cut extending at an acute angle to said axis from the other side of the respective pipe section. The acute edges along the second cut of the respective pipe sections, are joined together, and said gusset is inserted between the edges defined by said first cuts to permit joining these edges which extend normal to the axes of the respective sections.

The joint thus formed in the pipe is a Y-shaped seam, and the legs of the Y-shaped joints, when viewed from the side of the elbow or bend, are all of equal length.

BRIEF FIGURE DESCRIPTION

In order that the invention may be clearly understood, it will now be explained in greater detail by way of example with reference to the accompanying drawings, wherein.

DETAILED DESCRIPTION OF EXAMPLE EMBODIMENTS

Figure 1:
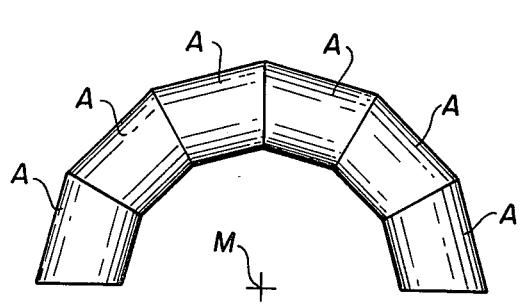
FIG. 1 is a side view of a prior art pipe elbow.

FIG. 1 shows a prior art pipe elbow or bend in which each of the sections A have a trapezoidal configuration as viewed from the side of the elbow toward a plane extending through the central axis of the elbow and through its center M of curvature. In cutting a straight piece of pipe into the trapezoidal sections it is unavoidable that wedge shaped portions become waste.

Figure 2:
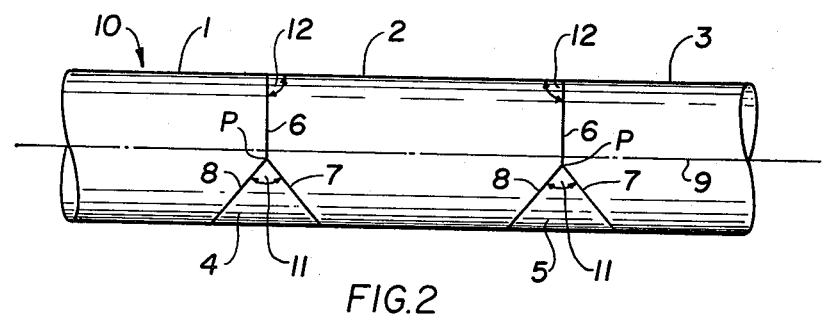
FIG. 2 is a side view of a piece of straight pipe illustrating the cutting lines along which the pipe is severed in accordance with the invention.

In accordance with the invention, a straight pipe 10 is, for example, severed into three sections, 1, 2 and 3. The severing is done in a special manner so that wedge shaped segments 4 and 5 will result simultaneously with the cutting of the sections 1, 2 and 3. According to the invention, three cuts are made between two adjacent pipe sections. One cut 6 extends perpendicularly relative to the longitudinal central axis 9 of the pipe 10. The cut 6 extends somewhat through the center line to a point P, as shown in FIG. 2.

Cuts 7 and 8 are then made from the opposite side of the pipe toward point P in such a manner that the circumferential length of each of cuts 7 and 8 will be the same as the circumferential length of cut 6. In this manner, the leg 6 of the Y-configuration of the cut will have the same length as each of the arms 7 and 8 of the cut.

The angle 11 between the arms 7 and 8 of the Y-configuration will depend on the size of the bend desired. In other words, if the elbow should make a sharp bend, as shown in FIG. 3, the angle 11 would approximate almost 90°, whereas the angle would be substantial less where a less sharp bend is intended.

Figure 3:
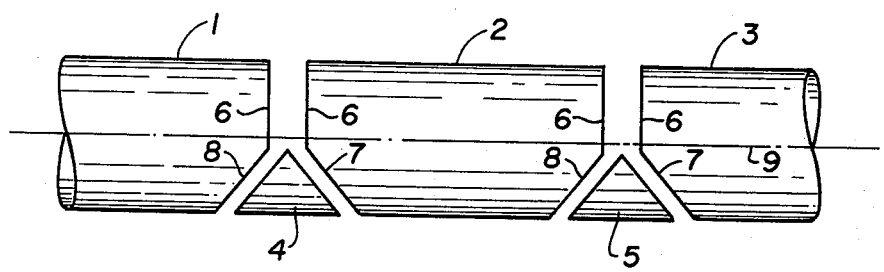
FIG. 3 is a view similar to that of FIG. 2, however, showing the pipe sections after severing.

FIG. 3 shows the sections 1, 2 and 3 and the segments 4 and 5 after the severing.

Figure 4:
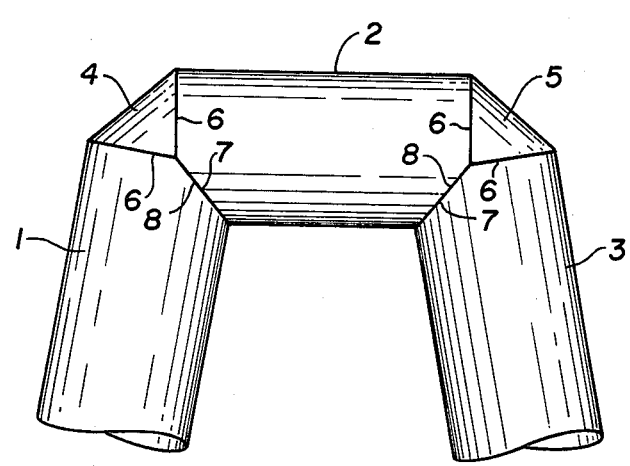
FIG. 4 shows a pipe end or elbow according to the invention.

FIG. 4 shows that the arms 7 and 8 of two adjacent pipe sections have been joined to each other after removing the wedge shaped segment. The joining may, for instance, be accomplished by welding in a manner known as such. The edges 6 along the sections are now spaced from each other by an angle which permits the exact fitting of the wedge shaped segment 4 without any waste material.

Figure 5:
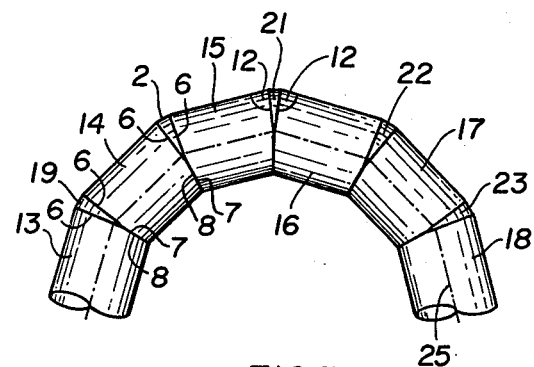
FIG. 5 shows a pipe according to the invention including a plurality of pipe sections.

FIG. 5 shows an elbow according to the invention with several sections 13, 14, 15, 16, 17 and 18 welded together at the Y-seams. However, in FIG. 5 the wedges 19, 20, 21, 22 and 23 have each a more acute angle than the wedge segments 4 and 5 in FIG. 2. However, the angle 12 in the outer corner of each pipe section is always a right angle. In FIG. 5 the center line 25 also extends slightly below the point where the arms and leg of the Y-configuration meet each other in order to assure that all the limbs of the Y-configuration are of equal length.

In the foregoing specification, the Y-configuration of the seam has been defined in terms of viewing the elbow or pipe from one side thereof. This definition means that each joint or seam has a Y-configuration as viewed toward a plane of symmetry passing through the axes of the individual pipe sections and the center of curvature of the elbow.

In accordance with the invention it is possible to avoid any waste whatsoever. In other words, the straight pipe section is used up completely for making the elbow. Yet another advantage of the invention is seen in that normally no beveling of the cut edges is required because the welding will equalize the cut edges.

Although the invention has been described with reference to specific example embodiments, it is to be understood, that it is intended to cover all modifications and equivalents within the scope of the appended claims.

What is claimed is:

1. A method of manufacturing a pipe elbow from a straight pipe having a longitudinal central axis, comprising making a first cut at a right angle to said central axis into the straight pipe from one side thereof to a point located off center relative to said central axis and closer to the opposite side of the pipe than to the side where the first cut begins, further cutting the straight pipe from the opposite side toward said point at such an acute angle that second and third cuts result each having the same depth as said first cut whereby the three cuts form a Y-configuration the arms and leg of which all have the same length, and whereby a wedge segment results between the arms of the Y-configuration, removing said wedge segment, joining the arms of the Y-configuration, inserting said wedge segment in the opening resulting from said joining and further joining the wedge segment to the edges which previously formed the leg of the Y-configuration, whereby waste is completely avoided.

2. The method according to claim 1, further comprising selecting said acute angle with due regard to the size of the bend or elbow to be formed.

3. A pipe elbow produced according to the method of claim 1, wherein said Y-configuration has limbs all of which have the same length.

* * * * *